(12) United States Patent
Blake et al.

(10) Patent No.: US 6,383,034 B1
(45) Date of Patent: May 7, 2002

(54) NETWORK ACCESS TERMINAL (75) Inventors: K. Erin Blake; Chois A. Blackwell, Jr., both of Watauga, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/791,460

(22) Filed: Feb. 23, 2001

(51) Int. Cl.⁷ .................................................. H01R 9/22
(52) U.S. Cl. .......................... 439/713; 439/49; 439/165
(58) Field of Search ........................... 439/49, 713, 165

(56) References Cited

U.S. PATENT DOCUMENTS

| | | | | |
|---|---|---|---|---|
| 3,085,220 A | * | 4/1963 | Sitz ............................... | 439/49 |
| 4,179,170 A | * | 12/1979 | Splitt et al. .................. | 439/107 |
| 4,764,849 A | * | 8/1988 | Khan ........................... | 361/428 |
| 5,001,602 A | | 3/1991 | Suffi et al. ................... | 361/724 |
| 6,035,032 A | | 3/2000 | Daoud ......................... | 379/326 |
| 6,065,975 A | * | 5/2000 | Daoud ......................... | 439/49 |
| 6,083,011 A | * | 7/2000 | Daoud ......................... | 439/49 |

* cited by examiner

Primary Examiner—Tulsidas Patel
(74) Attorney, Agent, or Firm—Christopher C. Dremann (57) ABSTRACT

A network access terminal includes an enclosure and a connector panel hinged to the enclosure such that a double-sided connector received within an opening in the panel does not need to be removed to access the rear of the connector. The enclosure has an opening such that telephone cables enter the enclosure and wiring is routed to the underside of the panel. The hinge is located along an edge of the panel adjacent the cable entry for optimum slack management. The network access terminal may also include a mechanical stop for limiting the travel of the panel and for supporting the panel while the technician routes and connects the wiring to the rear of the connector. The front of the panel may incorporate restricted access fasteners such that the underside of the panel can be accessed only by authorized personnel while still permitting access to the front.

18 Claims, 8 Drawing Sheets

FIG. 13

NETWORK ACCESS TERMINAL

BACKGROUND OF THE INVENTION

1. Field of the Invention

The present invention relates to an enclosure for wiring terminations. More specifically, the invention relates to a network access terminal having a connector panel that provides wiring termination points between telephone lines from multiple local exchange carriers ("LECs") and individual subscriber telephone lines so that a subscriber can be conveniently connected to any one of the LECs.

2. Description of the Related Art

Telephone service is available from a number of different telephone companies, referred to herein as the service provider. The subscriber may purchase as many separate telephone lines as he desires and equip his home or business with various telephone equipment. Subscribers are responsible for the proper operation of telephone equipment and the service provider is responsible for the proper operation of the telephone network equipment up to the interface between the service provider wiring and the subscriber wiring.

Before the deregulation of the local exchange telephone industry, an incumbent local exchange carrier (ILEC) had the exclusive right to provide local exchange telephone services to a subscriber. With this near monopolistic control, the ILECs laid extensive large pair count telephone cables throughout cities within their local access transport area (LATA). Oftentimes, such cables terminate in a building entrance terminal (BET) mounted on the side of a commercial building or a multi-tenant dwelling. The BET provides an enclosure for establishing and protecting multiple wiring terminations. The BET may also house protection elements, such as voltage surge protectors. For example, an ILEC might lay a telephone cable that contains 256 twisted pair of wires, even though the capacity of the cable far exceeds the immediate needs of the subscribers. Each twisted pair typically services a single phone line and comprises a tip wire and a ring wire. The twisted pair wires are then routed and terminated to a unique pair of tip and ring connectors within the BET for connection to the tip and ring wires of a particular subscriber line.

With industry deregulation, competitive local exchange carriers (CLECs) must now be given access to the subscriber wiring. The CLEC is entitled to lease the ILEC's existing infrastructure, including the BET and the telephone lines leading up to the BET. In addition, the CLEC is entitled to route its own telephone lines into the BET for termination with the subscriber wiring. However, many ILECs are concerned that the field technician employed by the CLEC might be inexperienced and may damage the equipment or existing wiring terminations within the BET.

Figure 1:
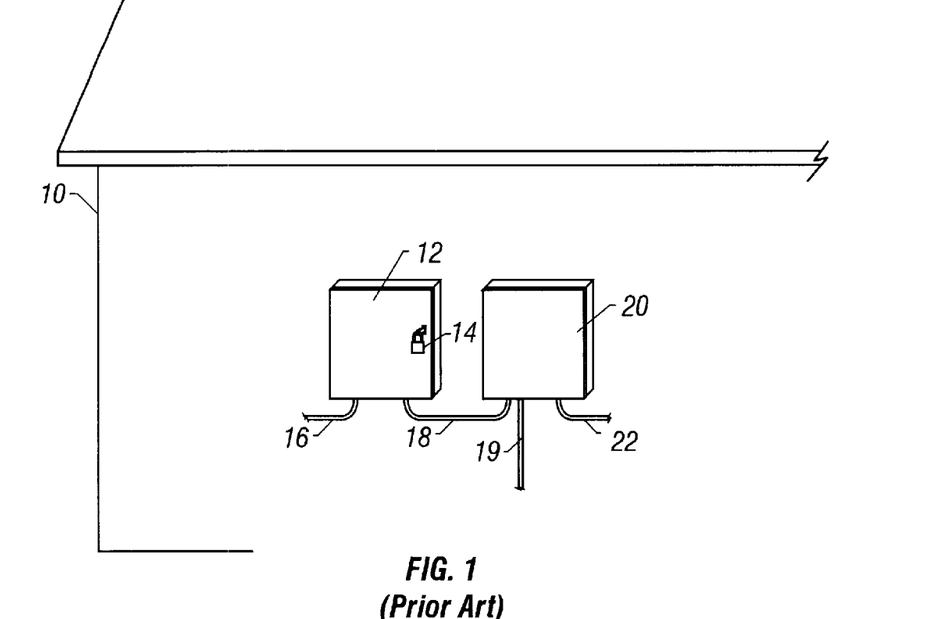
FIG. 1 is a perspective view of a building entrance terminal (BET) and a network access terminal illustrating a prior art solution to providing CLECs with access to subscriber wiring.

One solution is to provide a separate network access terminal, as shown in FIG. 1. A BET 12 is shown mounted on the side of a structure 10, such as a building or wall. The ILEC telephone cable 16 is shown entering the BET 12. Inside the BET 12, the cable 16 is separated into multiple telephone lines and each line is terminated to, for example, a connector. A lock 14 may be placed on the BET 12 to ensure that no one except an ILEC field technician has access to the BET 12. A second enclosure, the network access terminal 20 in FIG. 1 is also mounted on the structure 10. A patch cable 18 connects at least a portion of the terminated wires in the BET 12 to a similar connector within the network access terminal 20. A second patch cable 19 is provided by the CLEC from a BET (not shown) belonging to the CLEC and likewise is routed into the network access terminal 20 for a purpose to be described hereinafter. Subscriber wiring 22 enters the network access terminal 20 where it is also terminated, for example, to the connector within the network access terminal 20. Both ILEC and CLEC field technicians have access to the network access terminal 20.

If a CLEC leases several of the telephone lines in the ILEC cable 16, then access to those telephone lines is provided from within the network interface terminal 20 through the patch cable 18. The more likely situation, as illustrated in FIG. 1, is that the CLEC utilizes its own BET (not shown) and routes a separate patch cable 19 into the network access terminal 20 from its BET. Thus, a subscriber can be connected to either the ILEC's or the CLEC's telephone lines that are terminated in the network interface device 20. For example, a CLEC field technician can respond to a request for service from a particular subscriber by opening the network access terminal 20 and installing a jumper cable between one of the CLEC's telephone lines and the subscriber's telephone line.

Figure 2:
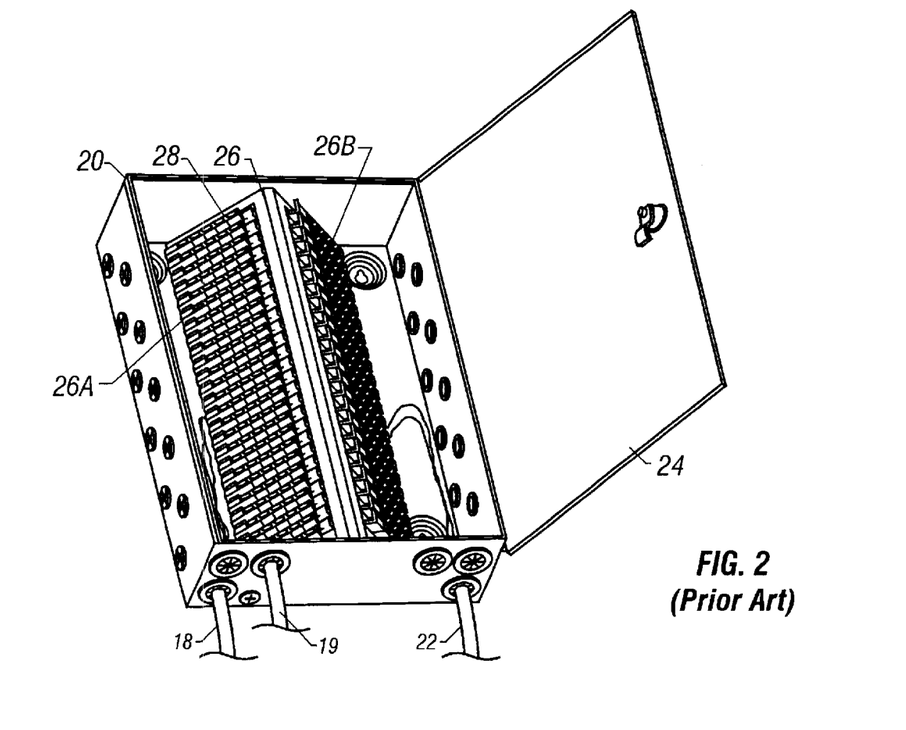
FIG. 2 is a perspective view of a prior art cross-connect cabinet.
Figure 3:
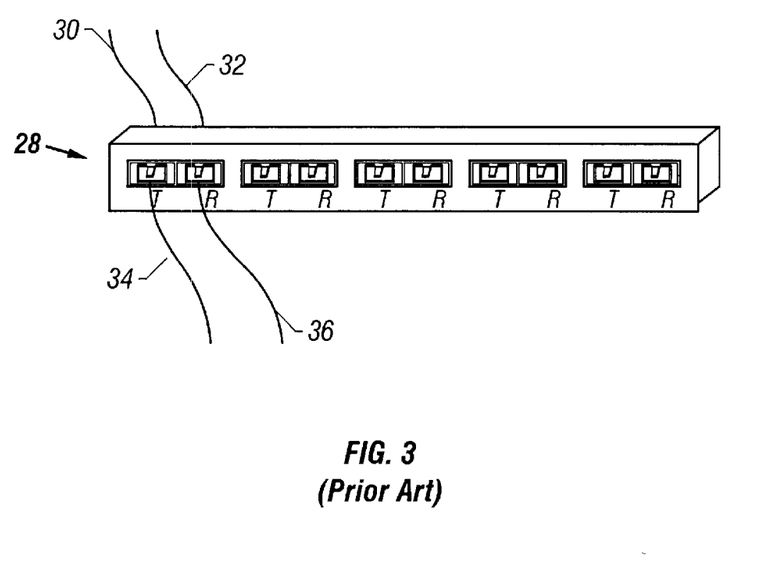
FIG. 3 is an enlarged perspective view of a modular connector having multiple pairs of insulation displacement connectors for receiving the tip and ring wires of a telephone cable.

Cross connect cabinets, such as the cabinet 20 shown in FIG. 2, are commercially available. The cabinet 20 can serve the same function as a network access terminal, and thus, is indicated herein by the same reference numeral. A door 24 protects an inner panel 26, also known as a layer. The panel 26 can have a service provider side 26A and a subscriber side 26B. Telephone cable 18 enters the cabinet 20, as shown, and is separated into a plurality of individual twisted pair wires. The twisted pair wires terminate into connectors 28. A more detailed view of a modular connector 28 is shown in FIG. 3. The connector 28 includes a number of individual termination points on both its front and rear surfaces. Thus, a tip wire and a ring wire 30, 32, respectively, from one twisted pair are inserted into the rear of a connector 28 on the service provider side 26A of the panel 26. Likewise the subscriber tip and ring wires are also terminated into the rear of a connector 28 on the subscriber side 26B of the panel 26. Wires 34, 36 of a jumper cable can then be inserted between the front of the connector 28 on the service provider side 26A of the panel 26 and the connector 28 on the subscriber side 26B of the panel 26. The connectors may be insulation displacement connectors (IDCs) to permit the connections to be made rapidly and without the need to strip insulation from the wires.

One problem with this type of panel 26 occurs during the initial insertion of the wires into the rear of the connector 28. The connector 28 must be removed from the panel 26 to give the field technician access to the rear of the connector 28. In some instances, there is not be enough slack in the wires to allow the field technician to connect the wires with the connector 28 removed from the panel 26. Even if there is enough slack to connect the wires, the field technician may damage the wires while replacing the connector 28 in place on the panel 26. Another problem with this type of panel 26 occurs if the wires 30, 32 terminating into the rear of a connector 28 must be relocated to another connector 28 or become disconnected. The connector 28 must be removed from the panel 26 and the wires 30, 32 carefully relocated to another connector or reinserted. Relocating or reinserting the wires 30, 32 typically requires an experienced and skilled field technician. Furthermore, during the relocating or reinserting process other wires connected to the rear of the connectors 28 can become inadvertently dislodged.

Therefore, a need exists for an improved network access terminal that permits easy access to the rear of the connectors on the connector panel.

A further need exists for a network access terminal that permits multiple LECs to easily route new wiring into the enclosure and to terminate the wiring into the rear of connectors on the connector panel.

A further need exists for a network access terminal that provides convenient management of wiring slack.

SUMMARY OF THE INVENTION

The present invention relates to a network access terminal that overcomes many of the disadvantages in the prior art. The network access terminal includes a unique connector panel configured such that the connector does not need to be removed from the connector panel to access the rear of the connector. The network access terminal includes an enclosure having a movable panel on which the connectors are mounted. The connectors mount to the panel such that one connector face is on the front of the panel and the other connector face is on the rear of the panel. Because the panel is movable relative to the enclosure, both the front and the rear of the connector are accessible without removing the connector from the panel.

In one embodiment, the enclosure is configured such that a telephone cable enters through the bottom of the enclosure and the wiring is routed to the underside of the connector panel. The connector panel is hinged to the enclosure and the hinge line is located adjacent to the bottom of the enclosure where the cable enters for optimum slack management. If the connector panel is a cross-connect panel having jumper fields, the near side of the panel may be provided with restricted access fasteners such that the underside of the panel can be accessed only by an ILEC while at the same time permitting a CLEC access to the near side of the panel. The enclosure may also feature a stop position to limit the travel of the panel when it is moved to an opened position. The stop position provides support for the panel while a field technician is connecting the wiring on the rear of the connector. Multiple cable entry locations permit termination of additional telephone cables, such as drop lines, as service is expanded to accommodate additional subscribers. Furthermore the connector panel is configured to accept rows of modular connectors, also known as connector modules, such that additional connectors may be installed on the connector panel after the initial installation is completed.

While the connectors illustrated herein are for twisted pair wires, the connectors may also be configured to accept coax cabling, network cabling, fiber optic cabling and any other sort of transmission means that might be used in the future to convey voice, video, data, or other electronic transmissions.

BRIEF DESCRIPTION OF THE DRAWINGS

One or more preferred embodiments of the invention, which will be described more fully hereinafter, are illustrated in the accompanying drawings in which.

DETAILED DESCRIPTION OF THE PREFERRED EMBODIMENTS

Figure 4:
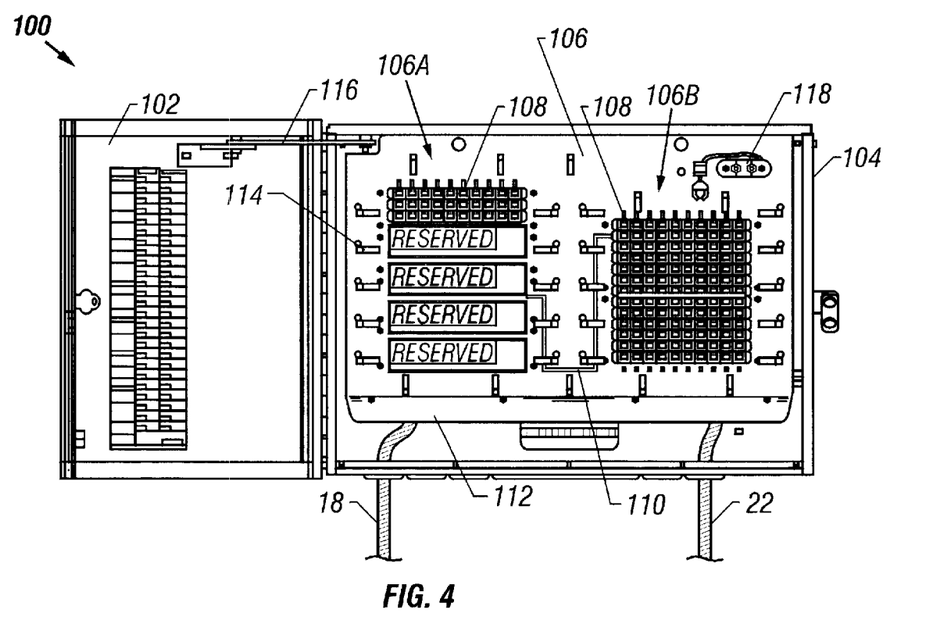
FIG. 4 is a front view of a preferred embodiment of a network access terminal having a connector panel according to the present invention.

The present invention relates to an improved network access terminal 100, as shown in FIG. 4. The network access terminal 100 includes an enclosure 104 and a door 102 movably attached to the enclosure 104. The door 102 is preferably hinged to the enclosure 104 and is shown in an open position with a bracket 116 supporting the door 102 in the open position. A connector panel 106 is mounted within enclosure. The panel 106 has at least one opening, and preferably a plurality of openings, therethrough that receive connectors 108, such as the modular connectors 28 shown in FIG. 3. As shown, the panel 106 has a service provider side 106A and a subscriber side 106B. Both the service provider side 106A and the subscriber side 106B receive modular connectors 108. For example, the service provider side 106A of panel 106 in FIG. 3 is provided with five individual sets of modular connectors 108, with each connector 108 comprising a plurality of pairs of IDCs for receiving tip and ring wires from a telephone cable. However, other connectors may be used that receive other types of communications transmission wiring, such as coaxial cable, fiber optic cable, and networking cable.

One or more telephone cables 18 enter into the enclosure 104 through an opening formed in the bottom of the enclosure. Each service provider cable 18 is separated into a plurality of twisted pair tip and ring wires (not shown). The service provider provides dial tone service to the tip and ring wires and each pair is terminated into the rear of one of the connectors 108 on the service provider side 106A of the panel 106. Likewise, a telephone cable 22 of subscriber telephone lines also enters into the enclosure 104 and each individual subscriber telephone line is terminated on the rear of a connector 108 on the subscriber side 106B of the panel 106. Wiring guides 114 may be provided on both the near side (as shown) and the far side of the panel to assist in management of the wiring slack. A jumper cable 110 can then be connected between the front of one of the connectors 108 on the subscriber side 106B of the panel 106 and one of the connectors 108 on the service provider side 106A of the panel 106, thereby completing the communications circuit between the subscriber and the service provider.

If the subscriber decides to switch service from the ILEC to the CLEC, a CLEC field technician opens the door 102 and identifies the subscriber's tip and ring wires and the connector 108 on the subscriber side 106B of the panel 106 that receives the subscriber's wiring. The field technician then detaches the end of the jumper cable 110 connecting the subscriber's wiring to the ILEC's wiring from the corresponding connector 108 on the service provider side 106A of the panel 106 and reattaches it to one of the connectors 108 on the service provider side 106A of the panel 106 having the CLEC's wiring terminated therein. The CLEC may lease wiring from the telephone cable 18 belong to the ILEC, or may route its own telephone cable (not shown) into the enclosure 104 through one of the other openings formed in the bottom of the enclosure 104. To make identification of the connectors 108 having the CLEC's wiring terminated therein easier, the service provider side 106A of the panel 106 may comprise several rows for banks of connector modules that are reserved for the CLEC. In other words, a CLEC may install its own set of connectors 108 in place of the ILEC's connectors 108 or in one of the rows reserved for banks of the connector modules belonging to the CLEC. The CLEC can then terminate its tip and ring wires into the rear of its own connectors 108. Thus, a CLEC may opt to lay its own wiring infrastructure so that it can route its own cable of wires into the enclosure 104 and terminate multiple wire pairs into multiple connectors 108.

Figure 5A:
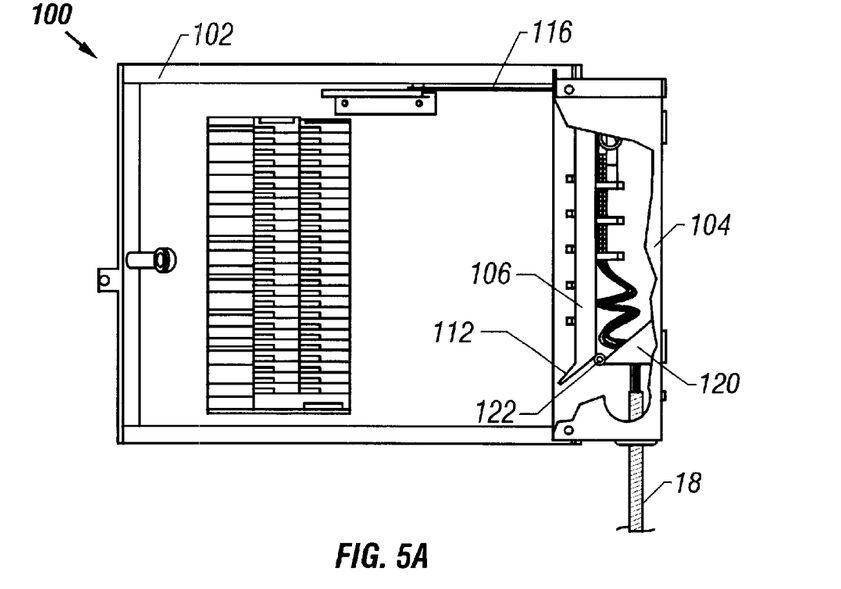
FIGS. 5A and 5B are side views of the network access terminal of FIG. 4 shown in both a first closed position and a second opened position.
Figure 5B:
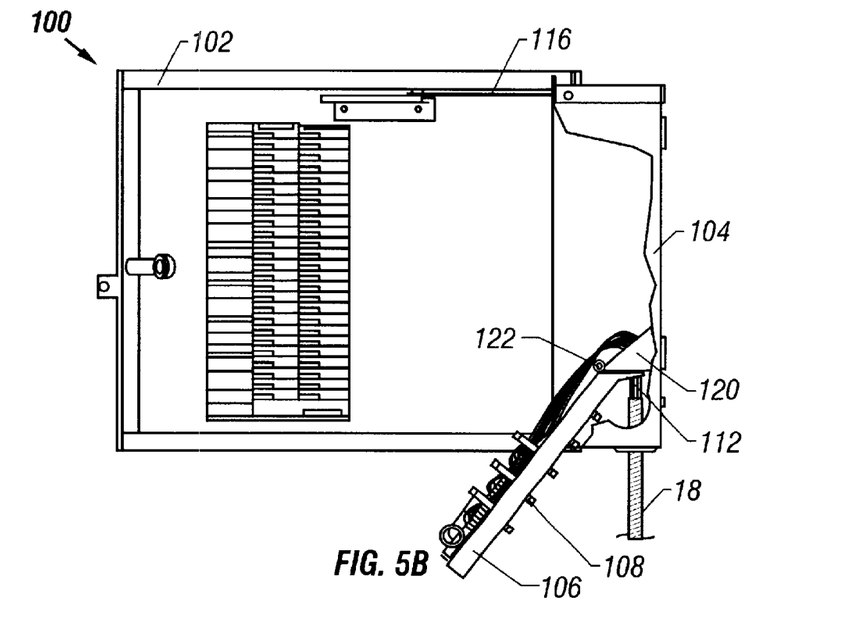

The panel 106 is movable relative to the enclosure 104 and is preferably hinged to the enclosure 104 along a hinge line 122 to permit the panel 106 to rotate outwardly away from the floor of the enclosure 104. A flange 112 is shown mounted along a lower edge of the panel 106. The flange 112 acts as a mechanical stop to limit the travel of the panel 106 when it is rotated between a first closed position, shown in FIG. 5A, and a second opened position, shown in FIG. 5B. The flange 112 engages the mounting bracket 120. The angle of rotation between the mounting bracket 120 and the panel 106 may be any suitable angle, however, in one embodiment, the angle of rotation is between about 100 degrees and about 200 degrees. An angle of rotation of about 135 degrees presents the underside of the panel 106 to a field technician at an angle of about 45 degrees, as illustrated in FIG. 5B. Allowing the panel 106 to rotate relative to the enclosure 104 about hinge line 122 makes it significantly easier for a field technician to access the rear of the connectors 108 on panel 106. The routing of the service provider wiring from cable 18 is also shown to illustrate the convenient slack management of the wiring that is provided by the network access terminal 100. Another feature of the network access terminal 100 that is field technician friendly is an on-board tester 118 located on the panel 106. The field technician can use the tester 118 to determine which of the connectors 108 are "live." In particular, the field technician can insert the leads of the tester 118 into the front of a service provider connector 108 to determine if a dial tone is present on the telephone line.

Figure 6:
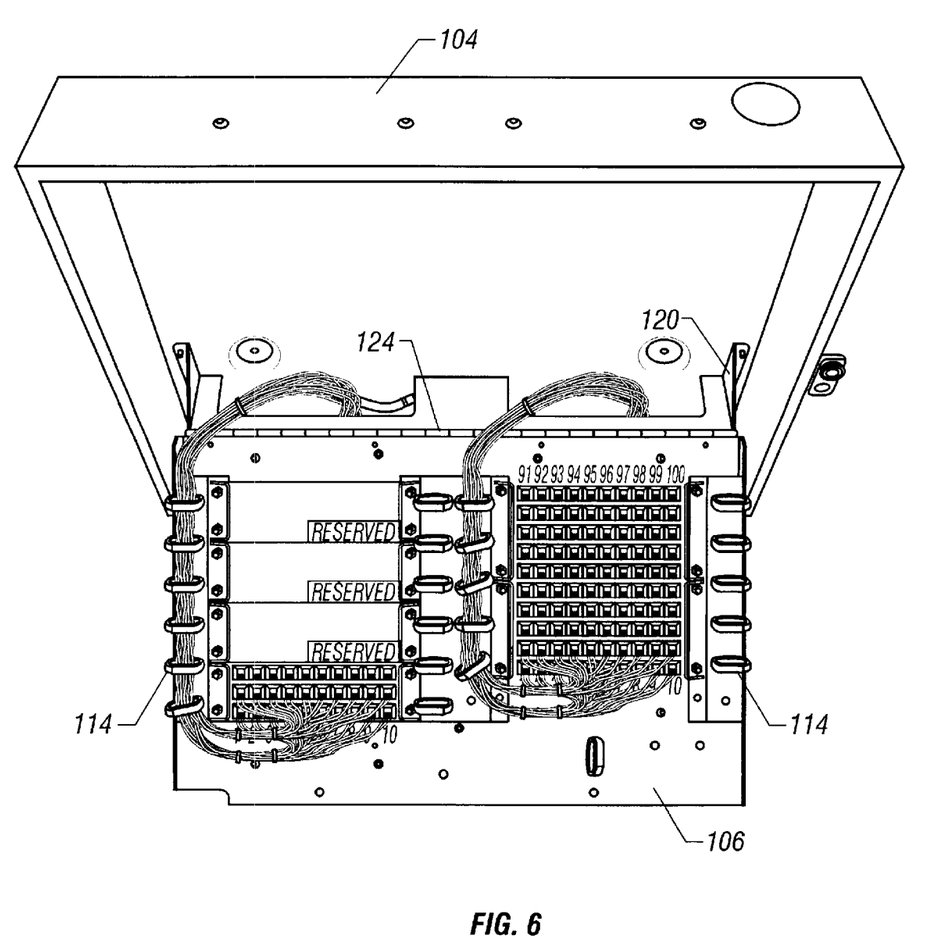
FIG. 6 is a top perspective view of the network access terminal of FIG. 4 shown in the opened position.

FIG. 6 is a perspective view of the underside of the connector panel 106. As best shown in FIG. 6, a hinge 124 is used to attach the panel 106 to mounting bracket 120 on the enclosure 104. The mounting bracket 120 spaces the panel away from the floor of the enclosure 104 and permits storage of the slack ILEC, subscriber, and CLEC (if utilized) wiring. As previously mentioned, wiring guides 114 are provided to guide the slack wiring along the edges of the panel for appropriate slack management. The service provider side 106A of the panel 106 is shown with three rows of connectors 108 and three blank panels, each capable of holding a row of connectors 108 for future expansion. In the event that a CLEC opts to install its own telephone cable into the enclosure 104, additional connectors 108 can be placed in reserved areas. The CLEC wiring can then be terminated in those additional connectors 108. Likewise, the subscriber cable 22 can be routed to the rear of the connectors 108 on the subscriber side 106B of the panel 106.

Figure 7:
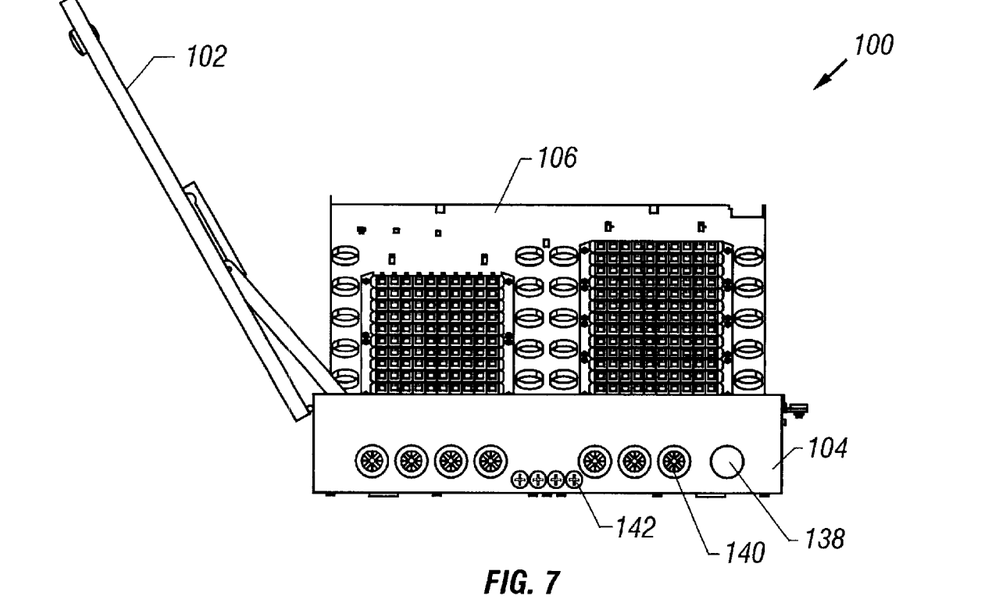
FIG. 7 is a bottom view of the network access terminal of FIG. 4 shown in the opened position.

FIG. 7 is a bottom view of the enclosure 104 of the network access terminal 100 with the panel 106 shown in the opened position. A plurality of additional openings may be formed in the bottom of the enclosure 104 to accommodate the insertion of additional telephone cables. One such opening 138, referred to in the art as a "knock-out," for the subscriber cable 22 is shown. Several additional openings 140 with grommet seals can be pre-placed for the orderly expansion of the network access terminal 100. It should be understood that the cable openings 138, 140 may be any size and may be placed on any surface of the network access terminal 100. Further openings 142 may be provided for access to ground the network access terminal 100 to a suitable ground.

Figure 8:
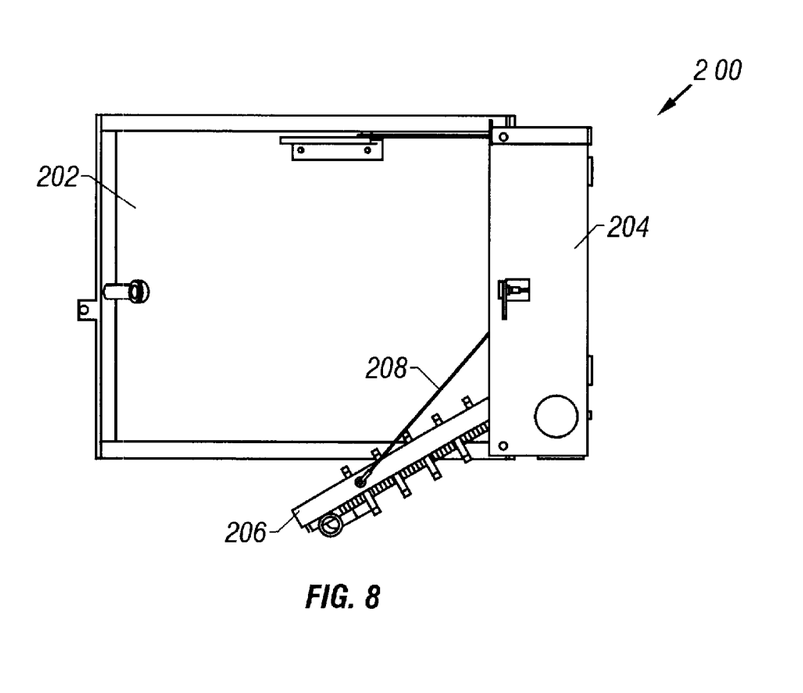
FIG. 8 is a side view of an alternative preferred embodiment of a network access terminal according to the invention shown in the opened position.

FIG. 8 is a side view of an alternative embodiment of a network access terminal 200 according to the present invention. In this embodiment, a hinge (not shown) is located along the lower edge of the connector panel 206 adjacent to the bottom of the enclosure 204. When the door 202 is opened, the panel 206 can be rotated outwardly away from the floor of the enclosure 204. However, rather than use of the flange 112 to limit the travel of the panel 206, a flexible cord 208 is used. The cord 208 is connected between the panel 206 and the floor or sidewall of the enclosure 104. The cord 208 limits the further rotation of the panel 206. The length of the cord 208 determines the angle of rotation of the panel 206 relative to the enclosure 204, and thus, the angle of presentation of the underside of the panel 206 to the field technician.

Figure 9:
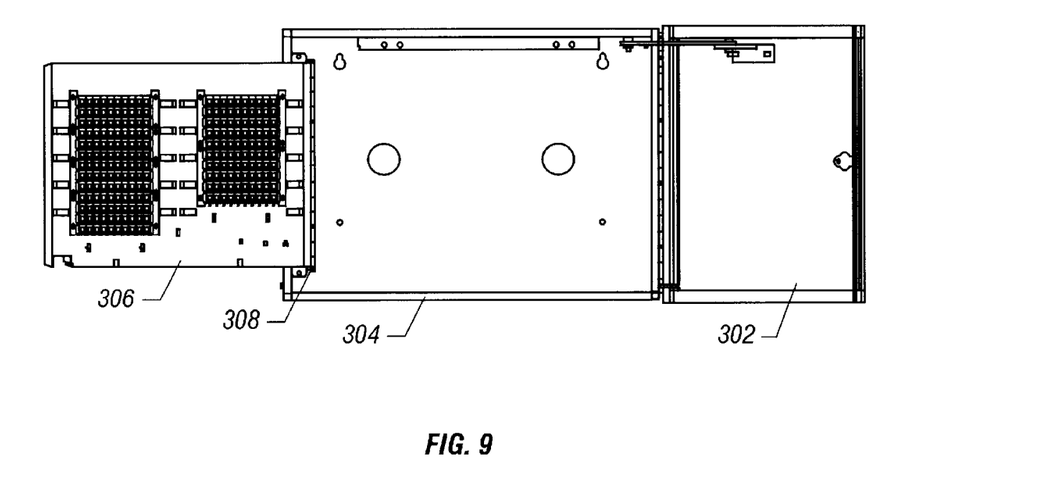
FIGS. 9 and 10 are front and bottom views, respectively, of yet another preferred embodiment of a network access terminal according to the invention wherein the connector panel is hinged on along a lateral edge of the enclosure.
Figure 10:
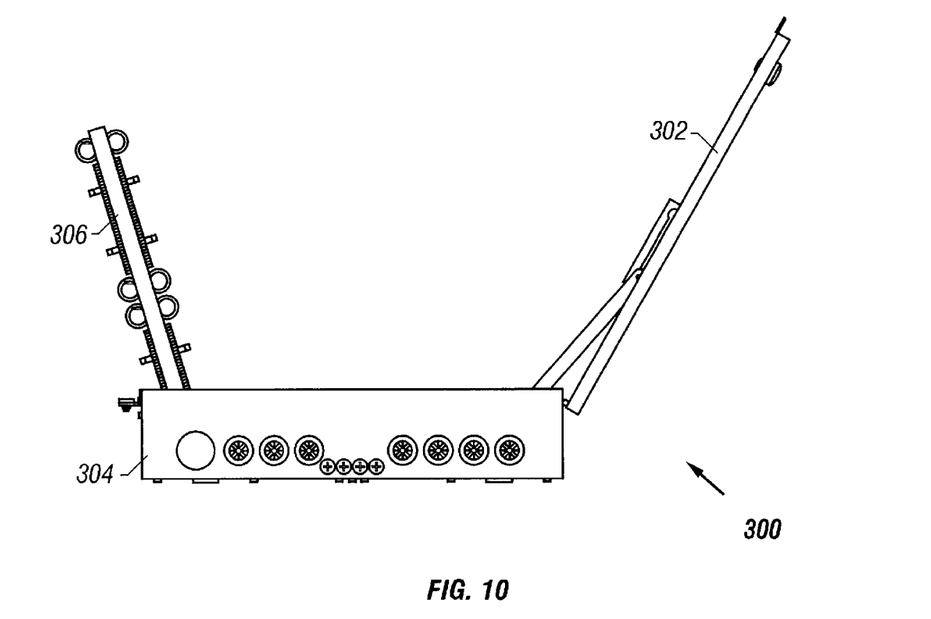

FIGS. 9 and 10 illustrate another aspect of the present invention, namely that the hinge does not have to be located along the lower edge of the panel 206. A network access terminal 300 is shown with the hinge 308 located along a side edge of the panel 306. When the door 302 of the enclosure 304 is opened, the panel 306 can be rotated outwardly from the floor of the enclosure 304. This provides a field technician with easy access to both the front and rear of the connectors on the panel 306. The travel of the panel 306 can be limited in the same ways as discussed above.

Figure 11:
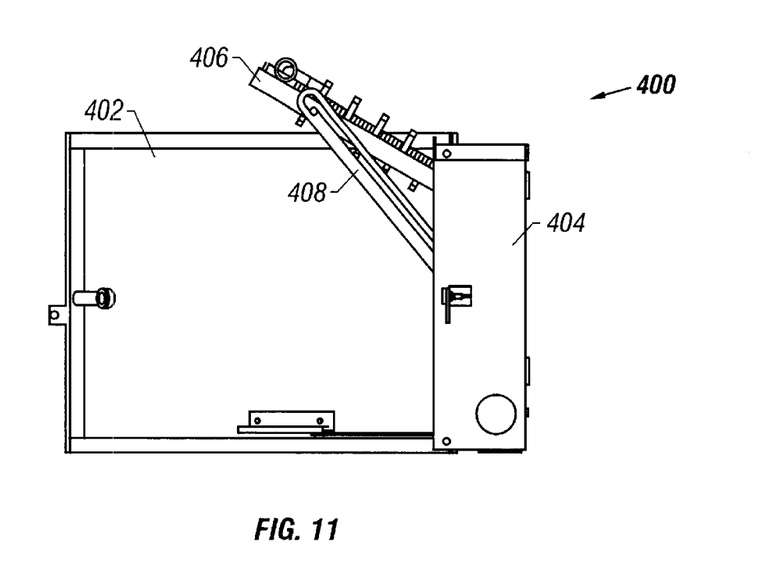
FIG. 11 is a side view of yet another preferred embodiment of a network access terminal according to the invention wherein the connector panel is hinged along a top edge of the enclosure.

FIG. 11 illustrates another variation of the present invention, namely one where the panel rotates upwardly away from the floor of the enclosure. The network access terminal 400 can include a panel 406 that is connected by a hinge (not shown) located along the top edge of the panel 406. Thus, when the door 402 of the enclosure 104 is opened, the field technician can lift the panel 406 upwardly and outwardly from the floor of the enclosure 404. To assist the stable positioning of the panel 406 in the opened position, a bracket 408 is provided with a notch to engage a peg depending from the side of the panel 406.

Figure 12:
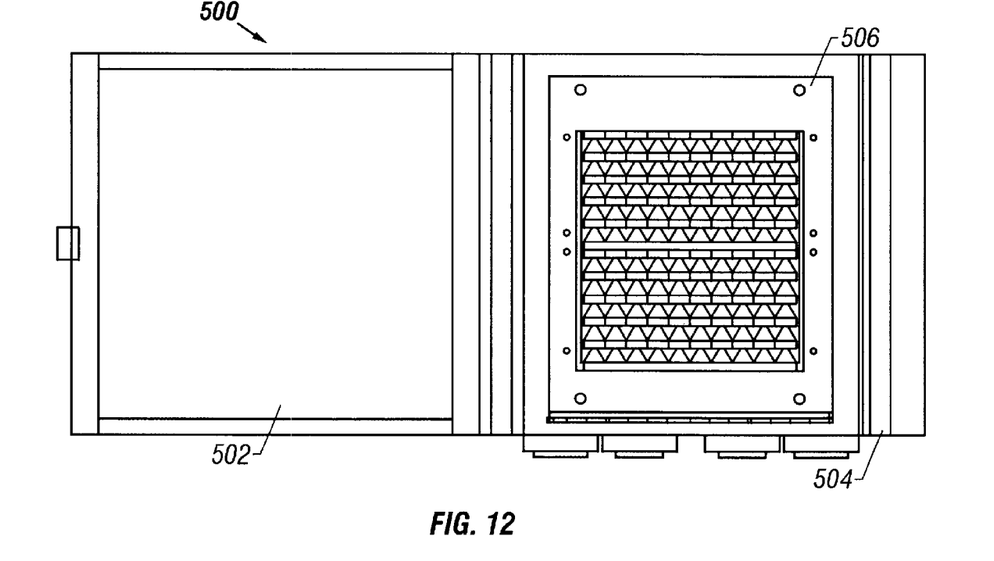
FIGS. 12 and 13 are front views of yet another preferred embodiment of a network access terminal according to the invention wherein the connector panel is an inter-connect panel shown in the closed and opened positions, respectively.
Figure 13:
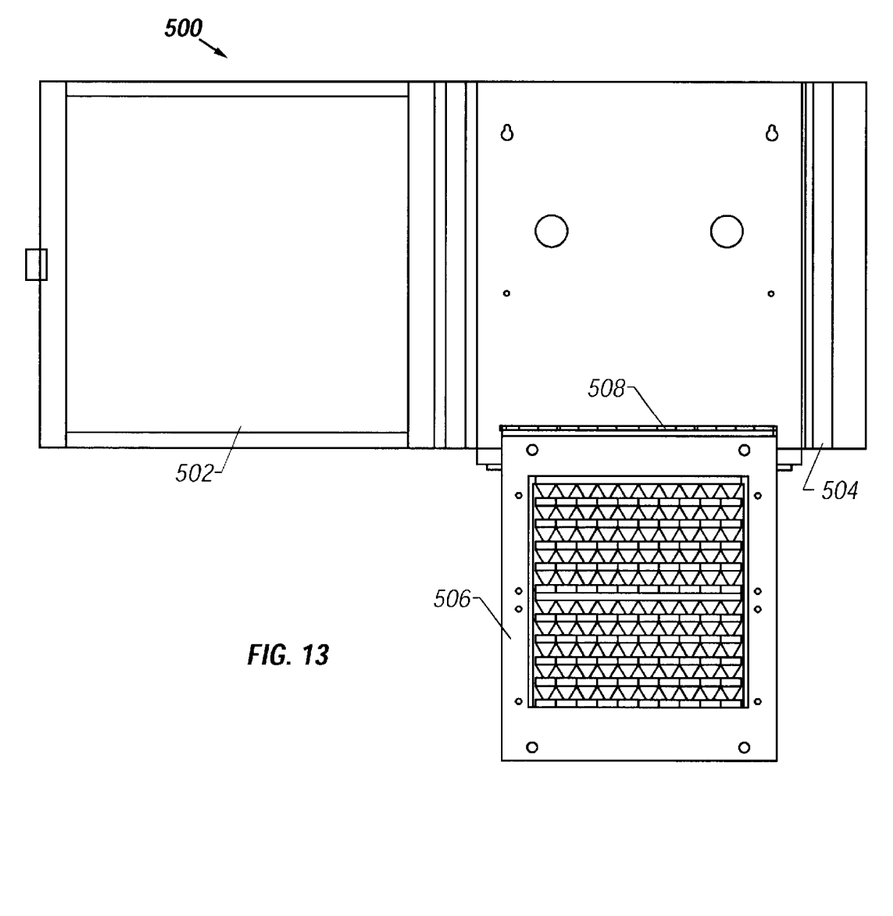

As previously mentioned, the present invention does not have to provide a cross connect panel. The network access terminal of the invention may instead provide a simple interconnect panel, as shown in FIGS. 12 and 13. In the embodiment 500 shown in FIGS. 12 and 13, a panel 506 is located within the enclosure 504. The panel 506 still incorporates a plurality of connectors. ILEC, subscriber, and CLEC (if utilized) wiring may still be routed to the underside of the panel 506 and connected to the rear of the connectors. When the door 502 of the enclosure 504 is opened, the panel 506 rotates about hinge 508. In this instance, ILEC wiring (and CLEC wiring, if utilized) may be connected to the rear of the connectors while the panel 506 is in the opened position, shown in FIG. 13. Subscriber wiring may then be connected to the front of the same connectors to interconnect the subscriber wiring and the ILEC (or CLEC) wiring in a known manner. Furthermore, the service provider wiring (ILEC or CLEC) may be connected to the front of the connectors while the subscriber wiring is connected to the rear of the connectors.

While the invention has been shown in only several of its many possible forms, it should be apparent to those skilled in the art that it is not so limited, but is susceptible to various changes without departing from the scope of invention. For example, while the discussion has focused on the use of the network access terminal with a plurality of twisted pair wires, it is also useful in establishing and protecting any number of connections between communications transmission media of any kind. Furthermore, while the invention anticipates that both the service provider wiring and the subscriber wiring is terminated on the underside of the connector panel, one or both could just as easily be terminated on the front side of the panel while the jumper cable connections are made on the underside of the panel. Accordingly, it is intended that the appended claims encompass any and all alternative embodiments of the invention not disclosed herein that are within the ordinary skill of a person knowledgeable in the art of terminating and connecting electrical wiring.

That which is claimed is:

1. A network access terminal comprising:
    an enclosure; and
    a connector panel attached to the enclosure and having at least one opening therethrough, the connector panel defining a service provider side and a subscriber side, the service provider side having at least one connector extending through the opening comprising a front portion and a rear portion for terminating wiring from a telephone cable, the subscriber side having at least one connector extending through the opening comprising a front portion and a rear portion for terminating wiring from a subscriber telephone cable;
    wherein the connector panel is movable relative to the enclosure between a closed position that permits access to the front portions of the connectors and an opened position that permits access to the rear portions of the connectors.

2. The network access terminal according to claim 1 wherein the connector panel is generally planar and has a lower edge, an upper edge opposite the lower edge and a pair of lateral side edges extending between the lower edge and the upper edge.

3. The network access terminal according to claim 2 wherein the connector panel is hinged to the enclosure along the lower edge.

4. The network access terminal according to claim 2 wherein the connector panel is hinged to the enclosure along the upper edge.

5. The network access terminal according to claim 2 wherein the connector panel is hinged to the enclosure along one of the lateral side edges.

6. The network access terminal according to claim 1 wherein the enclosure has a floor and a continuous sidewall depending from the floor and wherein the connector panel rotates outwardly away from the floor of the enclosure.

7. The network access terminal according to claim 1 further comprising a mechanical stop for limiting the movement of the connector panel to the opened position.

8. The network access terminal according to claim 7 wherein the mechanical stop comprises a flange on the connector panel and a mounting bracket for attaching the connector panel to the enclosure and for engaging the flange of the connector panel in the opened position.

9. The network access terminal according to claim 7 wherein the mechanical stop is a flexible cord extending between the connector panel and the enclosure.

10. The network access terminal according to claim 1 further comprising a jumper cable extending between the connector on the service provider side of the connector panel and the connector on the subscriber side of the connector panel to connect the wiring from the telephone cable to the wiring from the subscriber telephone cable.

11. A network access terminal comprising:
    an enclosure having a connector panel attached to the enclosure for movement relative to the enclosure between a closed position and an opened position, the connector panel defining a service provider side and a subscriber side, the service provider side having at least one connector comprising a front portion and a rear portion for terminating wiring from a telephone cable, the subscriber side having at least one connector comprising a front portion and a rear portion for terminating wiring from a subscriber telephone cable; and
    a mechanical stop for limiting the movement of the connector panel to the opened position.

12. The network access terminal according to claim 11 wherein is the mechanical stop comprises a flange on the connector panel and a mounting bracket for attaching the connector panel to the enclosure and for engaging the flange of the connector panel in the opened position.

13. The network access terminal according to claim 11 wherein the movement of the connector panel relative to the enclosure defines an angle of rotation between about 100 degrees and about 200 degrees.

14. The network access terminal according to claim 11 wherein the connector panel has at least one opening therethrough for receiving the connector on the service provider side of the connector panel and the connector on the subscriber side of the connector panel.

15. The network access terminal according to claim 11 further comprising a jumper cable extending between the connector on the service provider side of the connector panel and the connector on the subscriber side of the connector panel to connect the wiring from the telephone cable to the wiring from the subscriber telephone cable.

16. A network access terminal for permitting multiple local exchange carriers (LECs) access to subscriber wiring terminations, the network access terminal comprising:
    an enclosure having a floor and a continuous sidewall depending from the floor, the sidewall having a plurality of openings formed therethrough for receiving two or more telephone cables;
    a connector panel attached to the enclosure, the connector panel having at least one opening therethrough, the connector panel defining a service provider side and a subscriber side, the service provider side having at least one connector extending through the opening comprising a front portion and a rear portion for terminating wiring from the telephone cables, the subscriber side having at least one connector extending through the opening comprising a front portion and a rear portion for terminating wiring from a subscriber telephone cable;

wherein the connector panel is movable between a closed position that permits access to the front portions of the connectors and an opened position that permits access to the rear portions of the connectors.

17. The network access terminal according to claim 16 further comprising a mechanical stop for limiting the movement of the connector panel to the opened position.

18. The network access terminal according to claim 16 further comprising a jumper cable extending between the connector on the service provider side of the connector panel and the connector on the subscriber side of the connector panel to connect the wiring from the telephone cable to the wiring from the subscriber telephone cable.

* * * * *